US008967004B2

(12) United States Patent
Palfai et al.

(10) Patent No.: US 8,967,004 B2
(45) Date of Patent: Mar. 3, 2015

(54) ARMATURE WITH TORQUE LIMITER FOR ENGINE STARTER

(75) Inventors: Balazs Palfai, Fishers, IN (US); Attila Nagy, Fishers, IN (US)

(73) Assignee: Remy Technologies LLC, Pendleton, IN (US)

( * ) Notice: Subject to any disclaimer, the term of this patent is extended or adjusted under 35 U.S.C. 154(b) by 338 days.

(21) Appl. No.: 13/493,249

(22) Filed: Jun. 11, 2012

(65) Prior Publication Data

US 2013/0327182 A1 Dec. 12, 2013

(51) Int. Cl.

| | |
|---|---|
| ***F16H 15/00*** | (2006.01) |
| ***F16H 15/02*** | (2006.01) |
| ***F16H 15/06*** | (2006.01) |
| ***F02N 11/10*** | (2006.01) |
| ***F02N 15/02*** | (2006.01) |
| ***F02N 15/04*** | (2006.01) |
| ***F02N 15/06*** | (2006.01) |

(52) U.S. Cl.

CPC .............. *F02N 11/10* (2013.01); *F02N 15/022* (2013.01); *F02N 15/023* (2013.01); *F02N 15/046* (2013.01); *F02N 15/067* (2013.01)

USPC ................................................ 74/7 C; 74/7 R

(58) Field of Classification Search

CPC ...... F02N 15/022; F02N 11/00; F02N 15/025

USPC ....... 74/6, 7 R, 7 C, 7 E, 8; 310/78; 192/48.3, 192/48.92, 42, 104 R, 114 R, 150

See application file for complete search history.

(56) References Cited

U.S. PATENT DOCUMENTS

| | | | | |
|---|---|---|---|---|
| 3,851,532 A * | 12/1974 | Pfluger et al. | .................... | 74/7 A |
| 7,451,668 B2 * | 11/2008 | Hasegawa et al. | .............. | 74/7 E |
| 2004/0123686 A1 * | 7/2004 | Kajino et al. | ................... | 74/7 E |
| 2008/0276734 A1 | 11/2008 | Fulton | | |

* cited by examiner

*Primary Examiner* — David M Fenstermacher
*Assistant Examiner* — Jake Cook
(74) *Attorney, Agent, or Firm* — Maginot, Moore & Beck LLP

(57) ABSTRACT

An engine starter includes a gear assembly including a pinion gear. The engine starter further comprises an electric motor including an armature coupled to the gear assembly and configured to drive the gear assembly and the pinion gear. The armature includes a core member defining a central cavity extending in an axial direction within the core member. An armature shaft extends from the central cavity. A clutch arrangement is positioned in the central cavity. The clutch arrangement is configured to releasably couple the core member and the armature shaft.

18 Claims, 5 Drawing Sheets

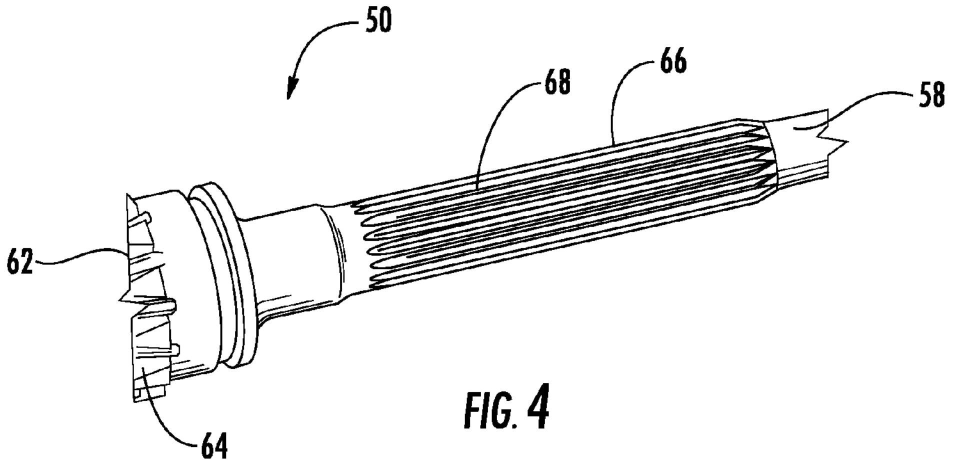
FIG. 4
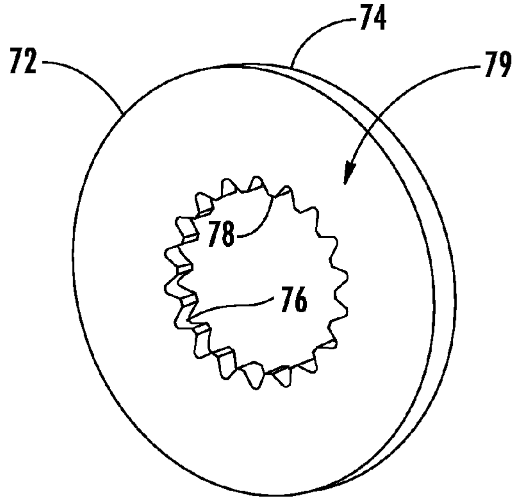
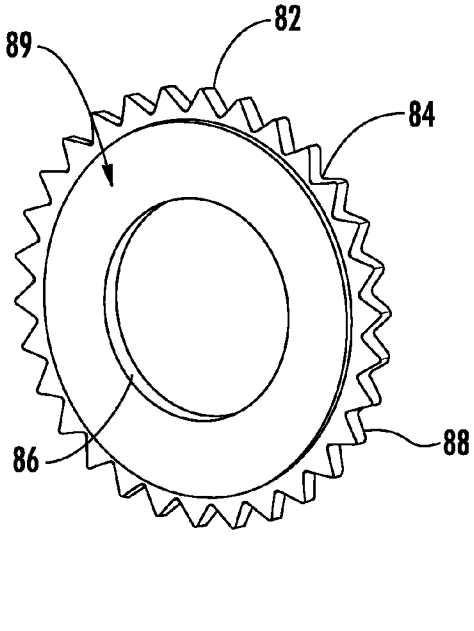
FIG. 5
FIG. 6

ARMATURE WITH TORQUE LIMITER FOR ENGINE STARTER

FIELD

The present disclosure relates generally engine starters for an internal combustion engines and particularly to engine starters including torque limiters.

BACKGROUND

Engine starters, which are also commonly referred to as "starter motors" or simply "starters", are used to crank vehicle engines. Most engine starters include an electric motor that is coupled to an internal gear train or other gear assembly. The gear assembly transfers rotation of the electric motor to a pinion gear of the engine starter. Exemplary gear assemblies include planetary gear arrangements connected to an output shaft of the electric motor. An overrun clutch is typically connected between the gear assembly and the pinion gear. A solenoid arrangement is configured to move the pinion gear between an engaged position where the pinion is meshed with the engine ring gear and a disengaged position where the pinion is removed from the engine ring gear.

To start an engine with the typical engine starter, the pinion gear is moved to the engaged position, in which the pinion gear becomes engaged with the engine flywheel via the ring gear. Next, the electric motor is fully energized, causing the pinion gear and the flywheel to rotate. The rotating flywheel puts the engine pistons into motion, which typically causes the engine to start. When the engine does start, the flywheel begins to rotate at a rate that is greater than that of the pinion gear, and the overrun clutch decouples the pinion gear from the output of the gear train. This prevents damage to the gear train, which may occur as a result of the rapidly rotating flywheel. The pinion gear is moved to the disengaged position after the engine is started.

When the pinion gear is engaged with the flywheel and is rotating the flywheel, the gear assembly and pinion gear of the engine starter experiences a pulsating torque resulting from moving engine parts, including piston movement within the engine cylinders. This pulsating torque is typically less than the stall torque (i.e., a magnitude of torque that causes the output shaft of the electric motor to stop rotating). However, the gear assembly may be loaded with a torque that is much greater in magnitude than the stall torque during certain engine events. These engine events may include engine backfire, hydraulic lock-up, a jammed pinion, or attempted engagement of the pinion gear with the flywheel after the engine is already started. The high torque is primarily caused by kinetic energy stored in the output shaft of the electric motor, which is then converted to strain energy upon rapid deceleration of the output shaft.

Vehicle manufacturers require that the engine starter should not fail or cause failure of other engine components as a result of the high-torque engine events such as those mentioned above. To meet this requirement, engine starter manufacturers design engine starter components to withstand a torque in excess of the stall torque. This often results in engine starter components being larger, heavier, or made from more robust and expensive materials than if the components were only required to withstand the torque encountered during normal engine operation. Additionally, many engine starters include torque limiters coupled to the gear assembly. These torque limiters are configured provide relief from excessive torque events preventing the pinion from being driven by the electric motor when a threshold torque is exceeded. Unfortunately, these torque limiters add unwanted additional size to the engine starter. Moreover, some torque limiters that have added only limited additional size to the engine starter have typically failed to accommodate sufficient torque capacity while also providing sufficient durability.

In view of the foregoing, it would be desirable to provide a torque limiter for an engine starter that is durable and accommodates large torque capacity. It would also be desirable for such torque limiter to add little or no additional size to the engine starter. Furthermore, it would be desirable for such torque limiter to be relatively easy and inexpensive to manufacture.

SUMMARY

According to one embodiment of the present disclosure, an engine starter comprises a gear assembly including a pinion gear configured to engage an engine ring gear. An electric motor is coupled to the gear assembly and is configured to drive the gear assembly and the pinion gear. The electric motor includes an armature (referred to herein as the "armature") configured to rotate within a stator. The armature includes a core member, an armature shaft positioned within the core member, and a clutch arrangement positioned between the core member and the armature shaft.

According to at least one embodiment of the present disclosure, an engine starter comprises a gear assembly including a pinion gear. The engine starter further comprises an electric motor including an armature coupled to the gear assembly and configured to drive the gear assembly and the pinion gear. The armature includes a core member defining a central cavity extending in an axial direction within the core member. An armature shaft extends from the central cavity. A clutch arrangement is positioned in the central cavity. The clutch arrangement is configured to releasably couple the core member and the armature shaft.

According to another embodiment of the present disclosure, an engine starter comprises a gear assembly including a pinion gear. The engine starter further comprises an electric motor including an armature coupled to the gear assembly. The armature is configured to drive the gear assembly and the pinion gear. The armature includes a core member, an armature shaft positioned within the core member, and a clutch arrangement configured to couple the core member to the armature shaft when a torque on the armature shaft is less than a threshold torque. The clutch arrangement is further configured to de-couple the core member from the armature shaft when the torque on the armature shaft is greater than the threshold torque.

BRIEF DESCRIPTION OF THE FIGURES

The above-described features and advantages, as well as others, should become more readily apparent to those of ordinary skill in the art by reference to the following detailed description and the accompanying figures in which:

FIG. 4 is a perspective view of the armature shaft of the armature of FIG. 3;

FIG. 5 is a perspective view of a first clutch disc provided on the armature shaft of FIG. 4;

FIG. 6 is a perspective view of a second clutch disc provided on the armature shaft of FIG. 4;

DESCRIPTION

Figure 1:
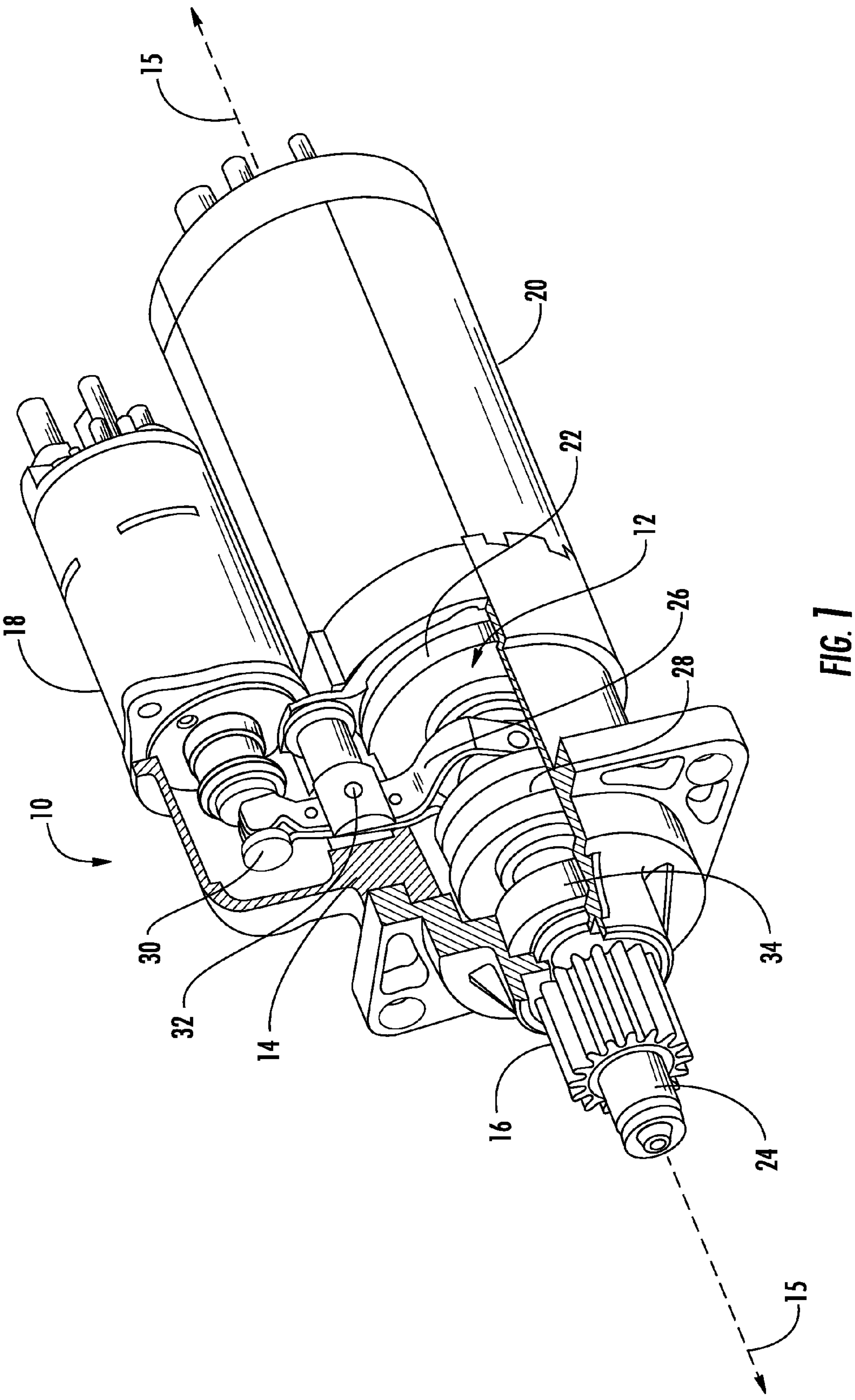
FIG. 1 is a perspective view of an engine starter including an armature with a torque limiter according to one embodiment of the present disclosure.

For the purpose of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

With reference to FIG. 1, an engine starter 10 includes a solenoid a gear assembly 12 positioned within a housing 14. The gear assembly 12 is configured to drive a pinion gear 16 that is configured to engage the ring gear of a vehicle engine (not shown). A solenoid 18 is also provided within the housing 14 and is configured to move the pinion gear 16 between a first position where the pinion gear 16 is disengaged from the ring gear and a second position where the pinion gear 16 engages the ring gear. An electric motor 20 is coupled to the gear assembly and is configured to drive the gear assembly. As explained in further detail below, a torque limiter is provided within the electric motor and is configured to limit the torque output that may be provided from the electric motor.

With continued reference to FIG. 1, the gear assembly 12 includes a planetary gear arrangement 22, as are known to those of ordinary skill in the art. The output of the planetary gear arrangement 22 is connected to an output shaft 24 such that rotation of the planetary gear arrangement 22 results in rotation of the output shaft 24. A spline gear (not shown) is provided on the output shaft of the gear arrangement 22.

The pinion gear 16 is configured to slide along the spline gear in the axial direction 15 between the engaged position and the disengaged position. The pinion gear 16 includes teeth that are configured to mesh with the ring gear of the vehicle engine when the pinion is in the engaged position. With reference to FIG. 1, the engaged position is an outermost position on the output shaft 24 where the pinion gear 16 is furthest away from the electric motor 20 and is in position to mesh with the engine ring gear. Conversely, the disengaged position is a more inward position on the output shaft 24 where the pinion gear 16 is closer to the electric motor 20.

The solenoid 18 is configured to move the pinion gear 16 between the engaged position and the disengaged position using a shift lever 26. The shift lever 26 extends between the solenoid 18 and an overrun clutch 28 that is slideably positioned on the drive shaft 24 along with the pinion gear 16. An output bearing 34 is also provided on the output shaft 24 between the overrun clutch 28 and the pinion gear 16. One end of the shift lever engages the plunger rod 30 of the solenoid 18 and the opposite end engages the slideable overrun clutch 28. The shift lever 26 is configured to pivot about a pivot point 32. When the solenoid 18 is activated, the plunger rod 30 on the solenoid 18 is drawn in the axial direction toward the solenoid 18. This causes the shift lever 26 to pivot about the pivot point 32 and move the overrun clutch 28 and the pinion gear 16 in the axial direction away from the electric motor 20 and toward engagement with the ring gear.

In many starter motor embodiments, full power is provided to the electric motor after engagement of the pinion gear 16 with the ring gear, thus allowing the starter to crank the vehicle engine.

As is known in the art, the overrun clutch 28 is configured to decouple the pinion from the gear assembly 12 after the engine fires and the speed of the engine flywheel and associated ring gear is such that the ring gear actually drives the pinion gear 16. In this situation, the overrun clutch 28 prevents the pinion gear 16 from driving the gear assembly 12 at an excess speed before the pinion gear 16 is moved to the disengaged position.

With continued reference to FIG. 1, the electric motor 20 is configured to drive the gear assembly 12, which in turn drives the pinion gear 16 during engine cranking. The electric motor 20 may be any of various types of electric motors as will be recognized by those of skill in the art. In the embodiment of FIG. 1, the electric motor 20 is a direct current motor including a stator with permanent magnets or other means for developing a field flux. The electric motor also includes an armature (not shown in FIG. 1; see FIG. 2) that serves as the armature and includes armature windings. The armature also includes an armature shaft with a gear on the end of the armature shaft. The armature is configured to rotate within the stator, thus resulting in rotation of the armature shaft and the gear on the end of the armature shaft. The gear on the end of the armature shaft engages the gear assembly 12 and acts as the sun gear of the planetary gear arrangement 22.

Figure 2:
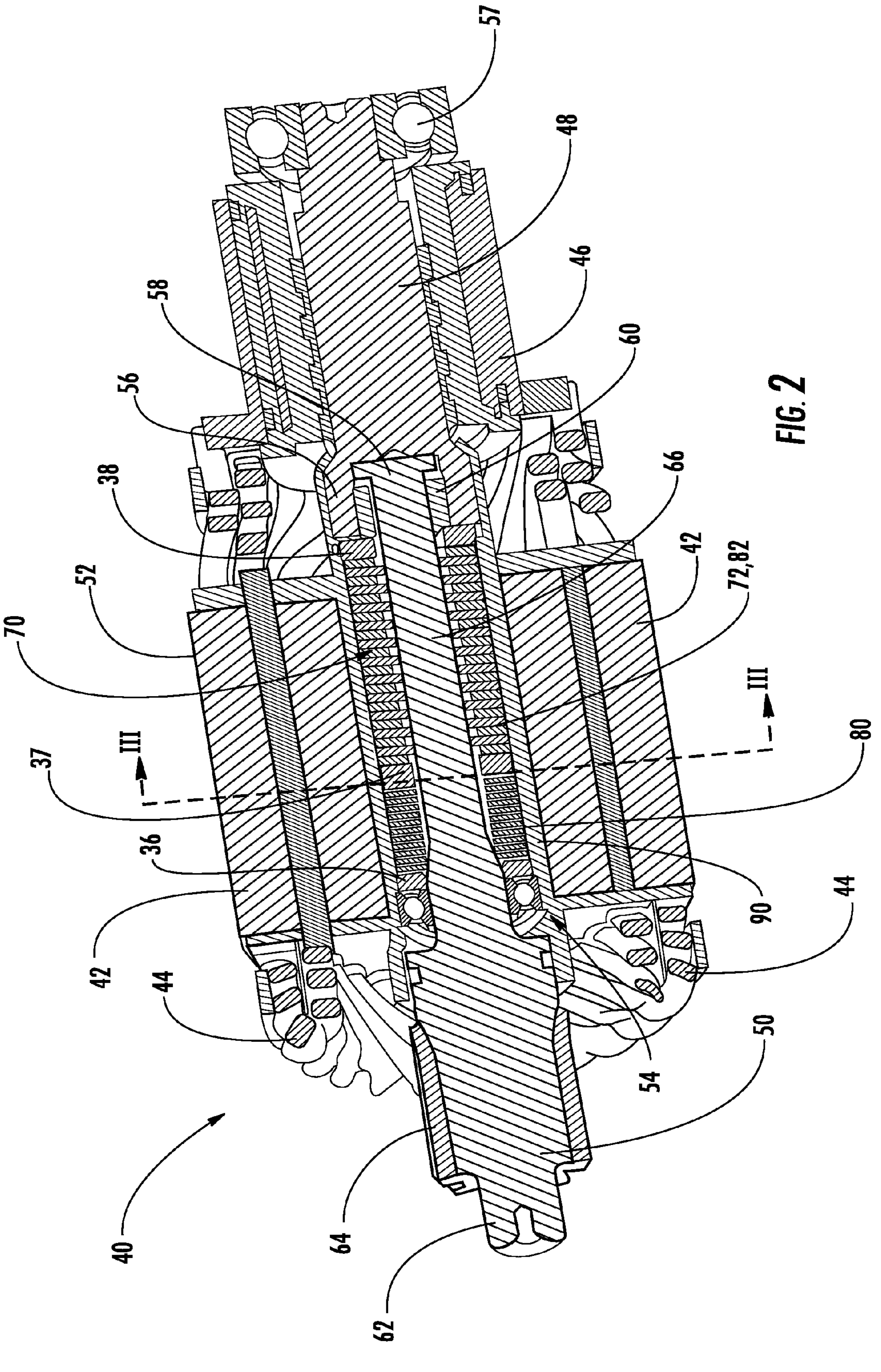
FIG. 2 is a cross-sectional view of the armature with torque limiter for the engine starter of FIG. 1.
Figure 3:
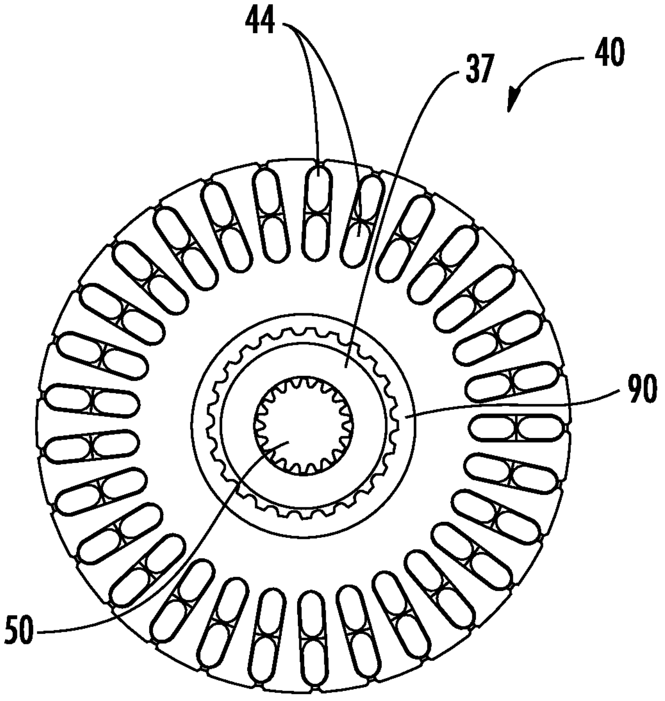
FIG. 3 is a cross-sectional view of the armature along line III-III of FIG. 2.

With reference now to FIGS. 2 and 3, an armature 40 is shown that serves as the armature for the electric motor 20 of FIG. 1. The armature 40 includes a core member 42, conductors 44, a commutator 46, a shaft coupler 48, an armature shaft 50, a clutch arrangement 70, and a core bushing 90.

The core member 42 of the armature 40 is provided as a stack of laminated steel plates. The core member 42 includes a substantially cylindrical outer wall 52 and a central cavity 54. The central cavity 54 extends in an axial direction from one end to another end of the core member 42. The core bushing 90 is fixed to the core member 42 within the central cavity 54 of the core member. A plurality of axial slots are also formed in the core member 42 between the central cavity 54 and the outer wall 52. These axial slots are configured to receive the conductors 44 that provide the armature winding. The slots of the core member 42 may be open, closed, or semi-closed slots, as will be recognized by those of skill in the art.

The conductors 44 in the slots may have any of various cross-sectional shapes including round, oval, square, rectangular, etc. Each conductor 44 extends through two different slots in the core member with a U-turn portion extending between the slots at one end of the core member 42. At the opposite end of the core member 42, the ends of the conductors 44 are connected to the commutator 46. To this end, the commutator 46 includes a plurality of segments configured to receive the conductors 44. Accordingly, the commutator 46 is fixed in relation to the core member 42 and rotates with the core member within the electric motor 20.

The shaft coupler 48 is positioned within the commutator and extends the length of the commutator. The shaft coupler 48 is a shaft-shaped member that includes a cup-like mouth 56 at an end closest to the central cavity 54. The opposite end of the shaft coupler is rotatably retained within a bearing 57. The shaft coupler 48 is fixed in relation to the commutator 46 and rotates along with the commutator and the core member 42.

The armature shaft 50 extends through the central cavity 54 of the core member 42. One end 58 of the armature shaft 50 is positioned in the mouth 56 of the shaft coupler 48. The end 58 is smooth and cylindrical in shape and is rotatably supported by a shaft bushing 60. Accordingly, the armature shaft 50 is rotatable with respect to the shaft coupler 48 and the core member 42 within the armature 40. An opposite end 62 of the armature shaft 50 includes an output gear 64. This end 62 of the armature shaft 50 extends from the end of the core member 42 where the conductor U-turns are located. As best shown in FIG. 4, a middle portion 66 of the armature shaft 50 is positioned between the two ends 58 and 62 of the armature shaft 50. The middle portion 66 of the armature shaft includes a plurality of axial splines 68. The axial splines 68 are formed by ribs that extend axially along the middle portion of the shaft with axial grooves formed between the ribs.

Figure 8:
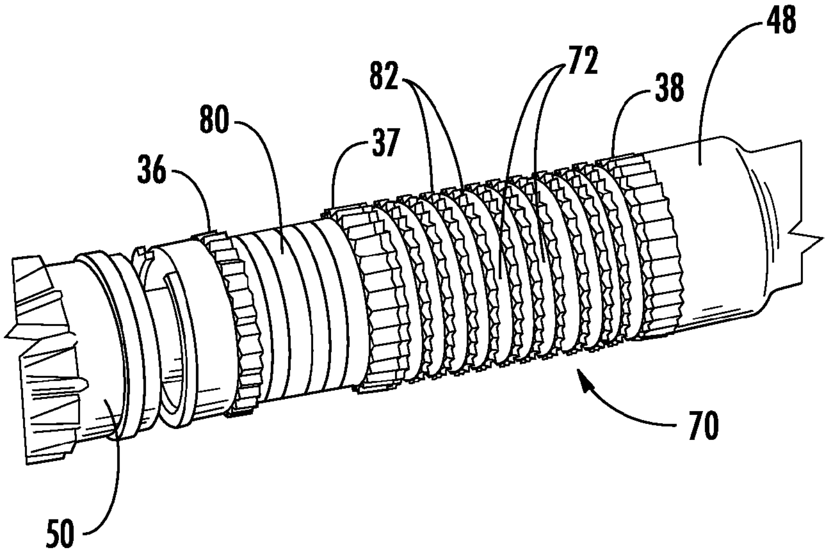
FIG. 8 is a perspective view of a plurality of the first clutch discs and second clutch discs assembled on the armature shaft of FIG. 4.

As best shown in FIGS. 2 and 8, the clutch arrangement 70 for the armature 40 includes the armature shaft 50, a plurality of clutch discs 72, 82, positioned on the armature shaft 50, a plurality of springs 80, and the core bushing 90. The plurality of clutch discs include first clutch discs 72 and second clutch discs 82 positioned on the middle portion 66 of the armature shaft 50. In the disclosed embodiment, eleven first clutch discs 72 and twelve second clutch discs 82 are positioned on the armature shaft 50. However, it will be recognized that any number of different clutch discs may be used to provide the desired threshold torque. For example, in at least one embodiment, the clutch arrangement 70 includes at least five first clutch discs 72 and at least five second clutch discs 82. These clutch discs 72 and 82 act as the friction plates for a multi-plate clutch arrangement, as will be described in further detail below.

With particular reference to FIG. 5, each first clutch disc 72 includes an outer perimeter 74 that is configured to fit within the central cavity 54 of the core member 42 and, more specifically, within the core bushing 90 within the central cavity 54. The outer perimeter 74 of the first clutch disc 72 is substantially smooth and circular in shape, allowing the first clutch disc 72 to rotate within the core bushing. The first clutch disc 72 further includes a central hole defined by an inner perimeter 76 that is configured to pass the armature shaft 50. The inner perimeter 76 includes a plurality of teeth 78 configured to mesh with the splines 68 on the armature shaft 50. Accordingly, the engagement between the teeth 78 and the splines 68 allows the first clutch discs 72 to slide in the axial direction 15 along the armature shaft 50, but prevents the first clutch discs 72 from rotating with respect to the armature shaft 52.

Each side of the first clutch disc 72 includes a face 79 that is configured to engage a face 89 of one of the second clutch discs 82. The faces 79 and 89 may be somewhat textured to provide a desired amount of friction between the discs 72 and 82. Friction between the discs 72 and 82 is also dependent upon the material discs 72 and 82 are comprised of. The discs 72 and 82 may be comprised of various materials, including, for example, metal, graphite, polymer, or composite materials.

With reference now to FIG. 6, each second clutch disc 82 includes a central hole defined by an inner perimeter 86 that is configured to pass the armature shaft 50. The inner perimeter 86 is substantially smooth and circular in shape. Thus, the inner perimeter 86 of the second clutch disc 82 rides on top of the splines 68 on the armature shaft 50, and the second clutch disc 82 is allowed to slide in the axial direction 15 and also rotate relative to the armature shaft 50. The second clutch disc 82 further includes an outer perimeter 84 that is configured to fit within the central cavity 54 of the core member 42 and, more specifically, within the core bushing 90 within the central cavity 54. A plurality of teeth 88 are provided on the outer perimeter 84. The plurality of teeth 88 are configured mesh with splines 98 on the core bushing 90. Accordingly, the engagement between the teeth 88 and the splines 98 allow the second clutch discs 82 to slide in the axial direction 15 within the core bushing 90, but prevent the second clutch discs 82 from rotating with respect to the core bushing 90.

Figure 7:
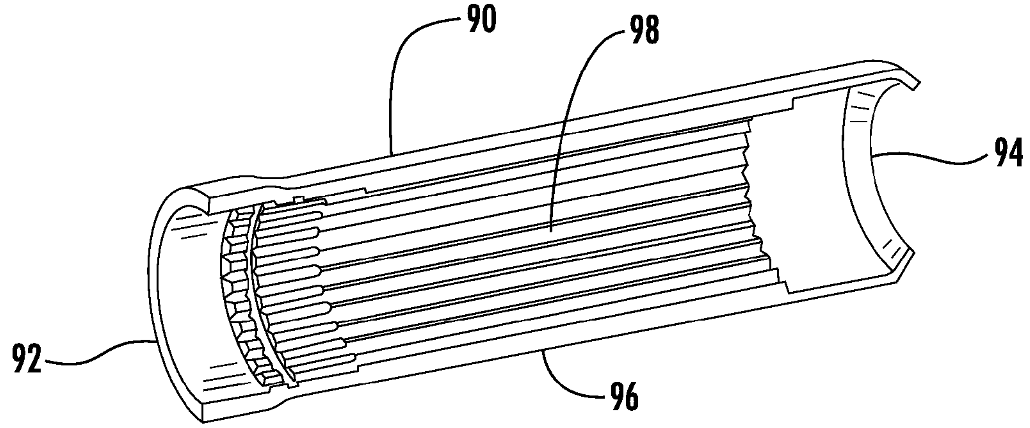
FIG. 7 is a perspective view of a core bushing for the armature of FIG. 2.

With reference now to FIG. 7, the core bushing 90 includes a first end 92, a second end 94, and a middle portion 96. As shown in FIG. 2, the first end 92 extends from the end of the core member 42 where the U-turn portions of the conductors 44 are located. The second end 94 is fixedly connected to the mouth 56 of the shaft coupler 48. The outer surface of the middle portion 96 is fixedly connected to the core member 42. Accordingly, the core bushing 90 is fixed relative to the core member 42 and the shaft coupler 48. The inner surface of the middle portion 96 includes a plurality of axial splines 98 comprised of axial ribs with axial grooves between the ribs. As mentioned previously, these axial splines 98 are configured to mesh with the teeth 88 on the outer perimeters 84 of the second discs 82, preventing the second discs 82 from rotating relative to the core bushing 90 and the connected core member 42. However, the engagement of the teeth 88 with the splines 98 does allow the second discs to slide in the axial direction. Additionally, because the outer perimeters 74 of the first discs 72 are smooth and only engage the tips of the splines 98 on the core bushing 90, the first discs 72 are allowed to rotate relative to the core bushing 90 and slide within the core bushing 90 in the axial direction.

With reference now to FIGS. 2 and 8, a biasing member in the form of at least one spring 80 is positioned about the armature shaft 50 and is configured to urge the first clutch discs 72 into engagement with the second clutch discs 82. In the embodiment shown in FIGS. 2 and 8, the spring 80 is retained between stationary disc 36 and axially slideable disc 37. The first and second discs 72 and 82 are retained between axially slideable disc 37 and stationary disc 38. The spring 80 urges the axially slideable disc 37 toward the first and second discs 72, 82, causing the first and second discs 72 to slide in the axial direction toward the stationary disc 38, thus forcing the faces of the discs 72, 82 to press against one another. As a result of this close engagement between the faces of the discs 72, 82, friction exists between the discs, and the discs tend to rotate together. The amount of friction between the discs is dependent on the material the discs 72, 82 are made of and any surface texturing that may provide some interlocking effect between the discs. The torque that the clutch arrangement 70 can transfer is a function of the friction coefficient of the discs 72, 82, the clamping force of the spring 80 on the discs 72, 82, the total number of clutch surfaces (i.e., the number of discs× 2), and the area of contact of the clutch surfaces of the discs as determined by the difference in the outer radius of the first disc 72 minus the inner radius of the second disc. In other words, $\tau=f(\mu, F, N, D)$, where $\tau$=the maximum torque that the clutch arrangement can transfer, $\mu$=the coefficient of friction of the discs, P=the clamping force of the spring, N=the number of clutch surfaces, and D=the difference in the outer radius and inner radius of the clutch discs.

In operation, electro-magnetic force causes the core member 42 of the armature 40 to rotate about axis 15. When the core member 42 rotates, the core bushing 90 also rotates. The engagement between the axial splines 98 on the core bushing 90 and the teeth 88 on the second discs 82 causes the second discs 82 to rotate along with the core member. The friction between the faces of the second discs 82 and the faces of the first discs 72 results in rotation of the first discs. The engagement between the teeth 78 of the first discs 72 and the axial splines 68 of the armature shaft 50 causes the armature shaft 50 to rotate along with the first discs. The output gear 64 then drives the planetary gear arrangement of the engine starter 10, resulting in rotation of the pinion gear 16.

When the engine starter experiences a high-torque engine event, such as those described above, the clutch arrangement 70 provides a torque limiter for the engine starter 10. In particular, during a high torque-engine event, the torque experienced by the planetary gear arrangement 22 and other drive train components is limited to the maximum torque that the clutch arrangement 70 can provide. Accordingly, consider an event where the pinion gear 16 suddenly jams and stops rotating. In this situation, the maximum torque that the electric motor can deliver to the pinion and other drive train components is limited by the maximum torque that the clutch arrangement 70 can transfer. When the drive train including the armature shaft 50 and output gear 64 suddenly cease rotation, the torque experienced between the first discs 72 and the second discs 82 of the clutch arrangement will be such that the first discs 72 slip relative to the second discs 82. Accordingly, the core member 42, shaft coupler 48, core bushing 90, and second discs 82 will continue to rotate even though the first discs 72 and armature shaft 50 have completely stopped rotation. Moreover, the torque transferred through the drive train will be limited to a threshold torque of the clutch arrangement 70.

As described above, the clutch arrangement 70 is configured to release the armature shaft 50 from the core member 42, allowing the core member 42 to rotate relative to the armature shaft 50 when a torque on the armature shaft is greater than a threshold torque. Advantageously, this arrangement limits the damage to the drive train components of the engine starter 10 in the event of a high-torque engine event. Moreover, because the clutch arrangement 70 is positioned completely within the armature 40 of the electric motor 20, no additional space within the engine starter 10 is required, and design of the engine starter may remain compact. Indeed, in the embodiment described herein, the entire clutch arrangement 70 is provided within the boundaries of the armature as defined on a first end by the U-turns of the conductor, and as defined on the second end by the commutator. More particularly, in the disclosed embodiment, the entire clutch arrangement is positioned within the core member 42 at the first end without extending to the conductor U-turns, and just past the core member 42 at the second end without extending to the commutator 46.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. An engine starter comprising:
- a gear assembly including a pinion gear configured to engage an engine ring gear; and
- an electric motor coupled to the gear assembly and configured to drive the gear assembly and the pinion gear, the electric motor including an armature configured to rotate within a stator, the armature including:
- a core member defining a central cavity extending in an axial direction;
- an armature shaft positioned within the core member; and
- a clutch arrangement positioned between the core member and the armature shaft, wherein the armature shaft and the clutch arrangement are positioned within the central cavity.

2. The engine starter of claim 1, wherein the clutch arrangement is a multi-plate clutch.

3. The engine starter of claim 2, the armature shaft including a first axial portion and a second axial portion, the first axial portion including an output gear positioned outside the core member, the second axial portion extending through a central cavity in the core member.

4. The engine starter of claim 3, the multi-plate clutch arrangement including a first plurality of clutch discs and a second plurality of clutch discs, the first plurality of clutch discs including teeth in meshed engagement with splines on the second axial portion of the armature shaft, and the second plurality of clutch discs including teeth in meshed engagement with splines on a core bushing positioned within the central cavity of the core member and fixed to the core member.

5. The engine starter of claim 4 further comprising at least one spring configured to bias the first plurality of clutch discs into engagement with the second plurality of clutch discs.

6. The engine starter of claim 5 wherein the core member is a lamination stack, the armature further comprising conductors extending through slots in the lamination stack.

7. The engine starter of claim 6, the armature further comprising a commutator connected to the conductors on an opposite side of the core member from the output gear, the commutator coaxial with a shaft coupler, the shaft coupler fixedly connected to the core bushing and rotatably connected to the armature shaft via a shaft bushing.

8. The engine starter of claim 4 wherein the first plurality of clutch discs include at least five clutch discs with inner perimeter teeth and the second plurality of clutch discs include at least five clutch discs with outer perimeter teeth.

9. The engine starter of claim 1 wherein the clutch arrangement is configured to release the armature shaft from the core member such that the core member rotates relative to the armature shaft when a torque on the armature shaft is greater than a threshold torque.

10. An engine starter comprising:
- a gear assembly including a pinion gear; and
- an electric motor including an armature coupled to the gear assembly and configured to drive the gear assembly and the pinion gear, the armature including:
- a core member defining a central cavity extending in an axial direction within the core member;
- an armature shaft extending from the central cavity; and
- a clutch arrangement positioned in the central cavity, the clutch arrangement configured to releasably couple the core member and the armature shaft.

11. The engine starter of claim 10 wherein the clutch arrangement includes a plurality of first discs, a plurality of second discs, and at least one biasing member configured to urge the first discs into engagement with the second discs.

12. The engine starter of claim 11 further comprising a core bushing positioned in the central cavity between the core member and the armature shaft, the core bushing and the armature shaft each including axial splines, wherein the first discs include teeth that engage the axial splines on the armature shaft and the second discs include teeth that engage the axial splines on the core bushing.

13. The engine starter of claim 10 wherein the core member is an armature lamination stack and a plurality of conductors extend through slots in the armature lamination stack.

14. The engine starter of claim 10 wherein the clutch arrangement is configured to release the armature shaft from the core member such that the core member rotates relative to the armature shaft when a torque on the armature shaft is greater than a threshold torque.

15. An engine starter comprising:

a gear assembly including a pinion gear; and an electric motor including an armature coupled to the gear assembly and configured to drive the gear assembly and the pinion gear, the armature including:

a core member defining a central cavity;

an armature shaft positioned within the core member;

a clutch arrangement positioned within the central cavity and configured to couple the core member to the armature shaft when a torque on the armature shaft is less than a threshold torque and configured to de-couple the core member from the armature shaft when the torque on the armature shaft is greater than the threshold torque.

16. The engine starter of claim 15 wherein the clutch arrangement is a multi-plate clutch including a plurality of discs.

17. The engine starter of claim 15 wherein the electric motor is configured to rotate the pinion gear via the drive assembly, the engine starter further including a solenoid configured to drive the pinion in an axial direction.

18. The engine starter of claim 15 wherein the armature further includes a plurality of conductors and a commutator, the plurality of conductors forming U-turn portions on a first end of the core member and the commutator is positioned axially past a second end of the core member that is opposite the first end, wherein the clutch arrangement is positioned entirely between the first end of the core member and the commutator.

* * * * *